United States Patent

[11] 3,613,731

[72] Inventor Robert A. Whitlock
 Rockford, Ill.
[21] Appl. No. 45,708
[22] Filed June 12, 1970
[45] Patented Oct. 19, 1971
[73] Assignee AquaMatic, Inc.
 Rockford, Ill.

[54] MULTIPORT VALVE
 18 Claims, 12 Drawing Figs.
[52] U.S. Cl. .................................................. 137/625.29
[51] Int. Cl. ................................................. F16k 11/02
[50] Field of Search .................................... 137/625.29

[56] References Cited
 UNITED STATES PATENTS
 2,146,983  2/1939  Pick ............................. 137/625.29 X
 3,380,590  4/1968  Grayson ....................... 137/625.29 X
 3,463,191  8/1969  Addison ....................... 137/625.29
 3,476,151  11/1969 Hegsted ....................... 137/625.29

Primary Examiner—Arnold Rosenthal
Attorney—McCanna, Morsbach, Pillote & Muir

ABSTRACT: The valve is of the lift-turn type and includes a plastic stator, a plastic cover overlying the stator, a plastic rotor cooperable with the stator to control the flow of fluid through the valve, and a resilient gasket between the stator and the rotor and cover. The stator is arranged for mounting directly in a top opening of the treatment tank and all external connections are to the stator. The major flow chambers in the stator are arranged in four quadrants thereof and the flow ports at the inner face of the valve all lie within an imaginary circle having its center at the center of rotation of the rotor. Smaller auxiliary ports are located radially outwardly of the imaginary circle for controlling brining, refill of the brine tank, and one or more service valves, if used. The same channel in the rotor which interconnects the auxiliary ports for the brining operation is also utilized for interconnecting two auxiliary ports during service to relieve the service valve connection to drain.

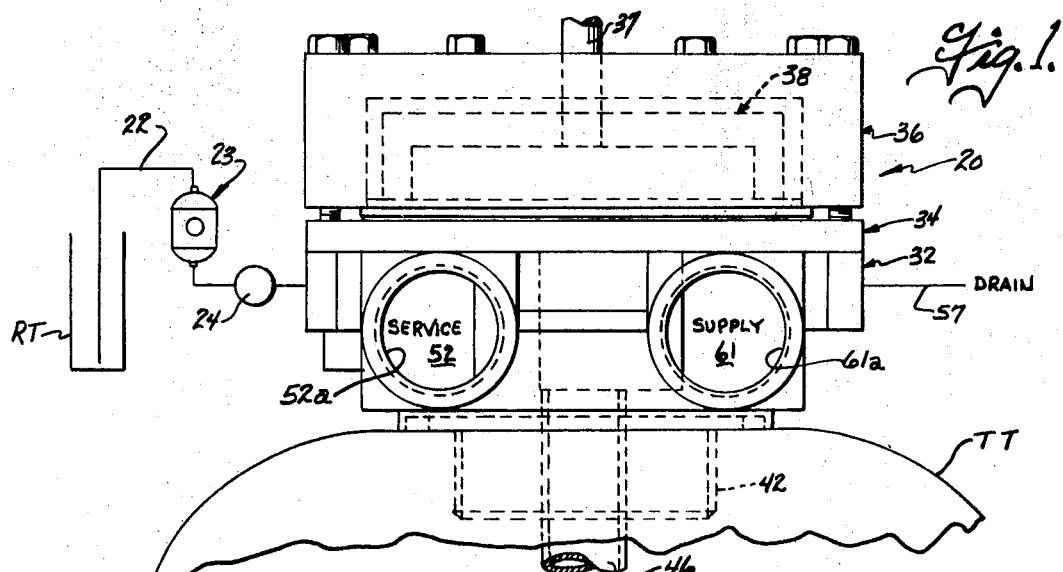
Fig. 1.
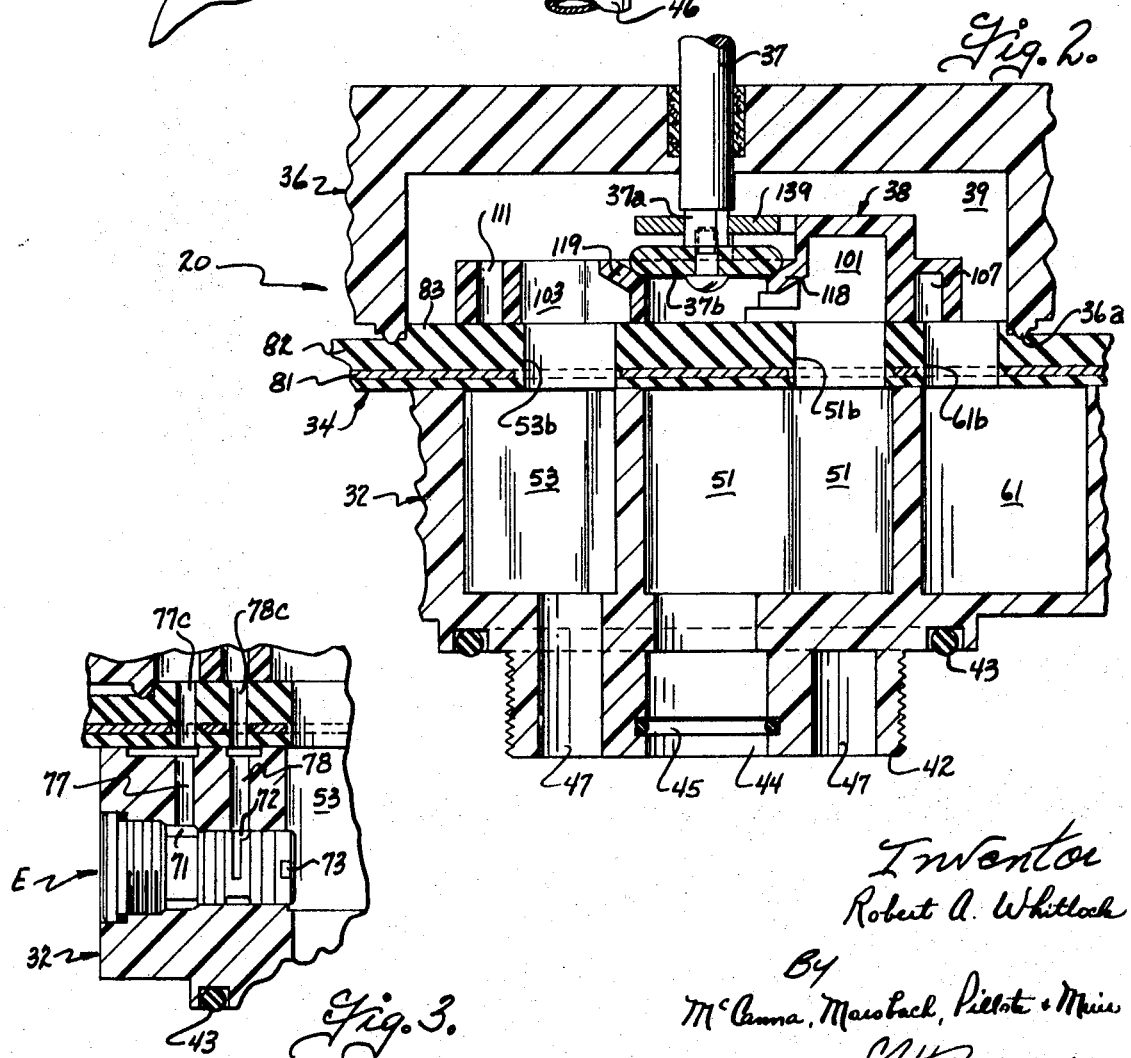
Fig. 2.
Fig. 3.
Inventor
Robert A. Whitlock
By
McCanna, Marsback, Pillote & Muir
Attorneys

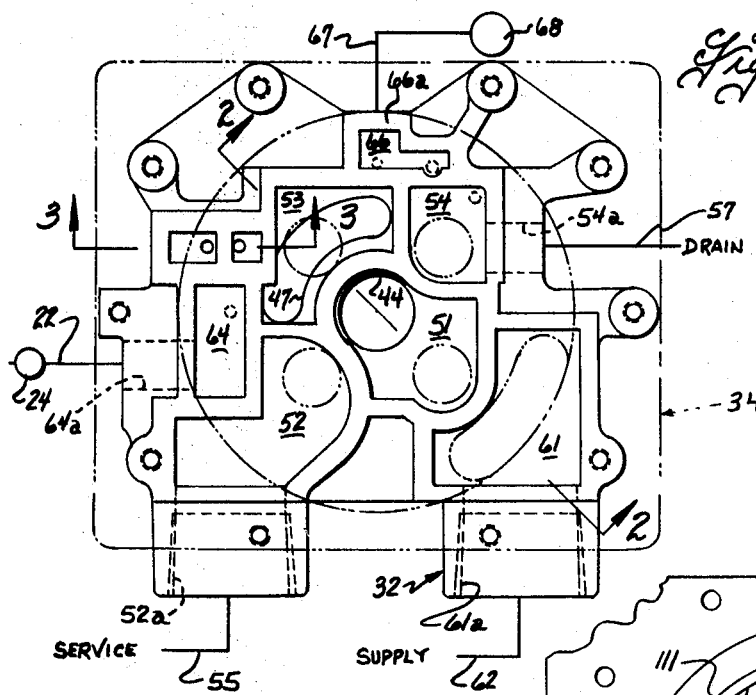
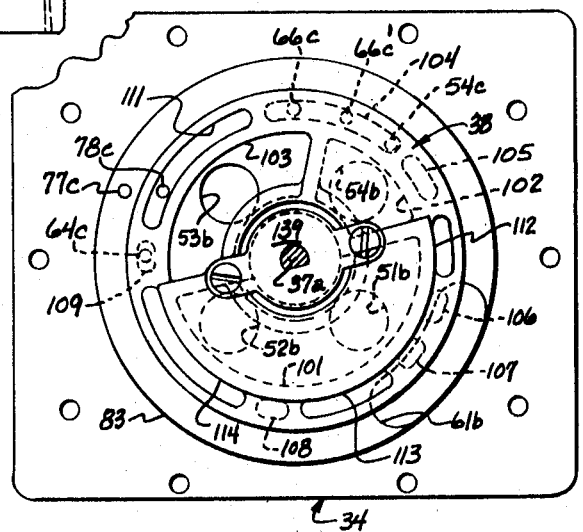
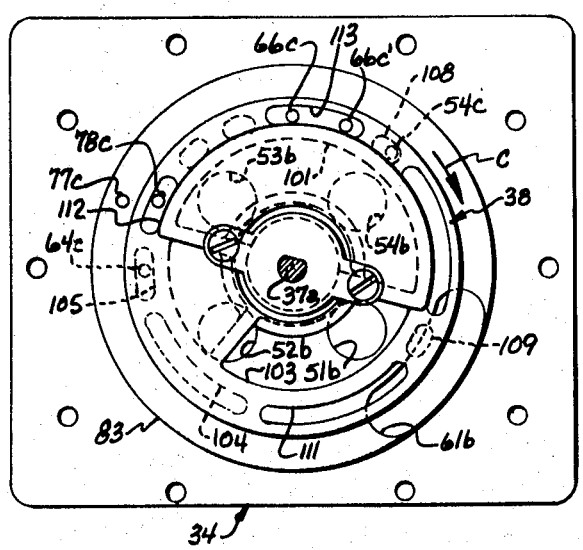

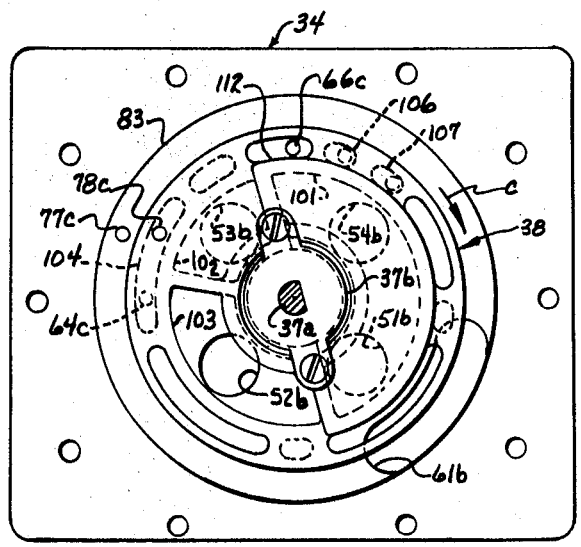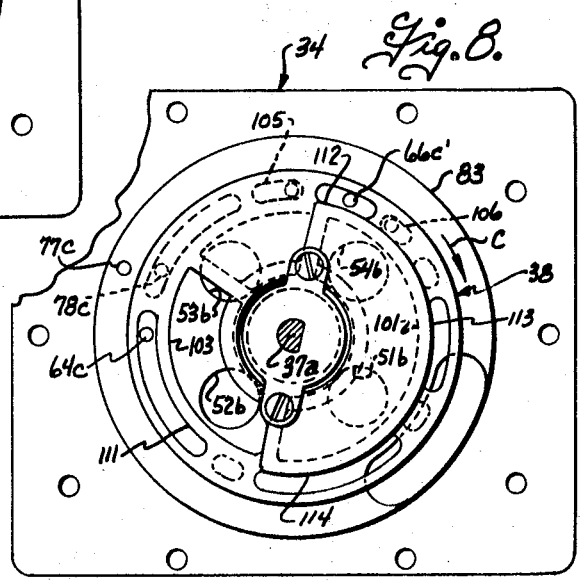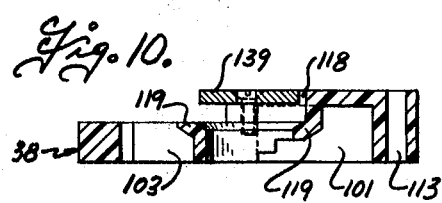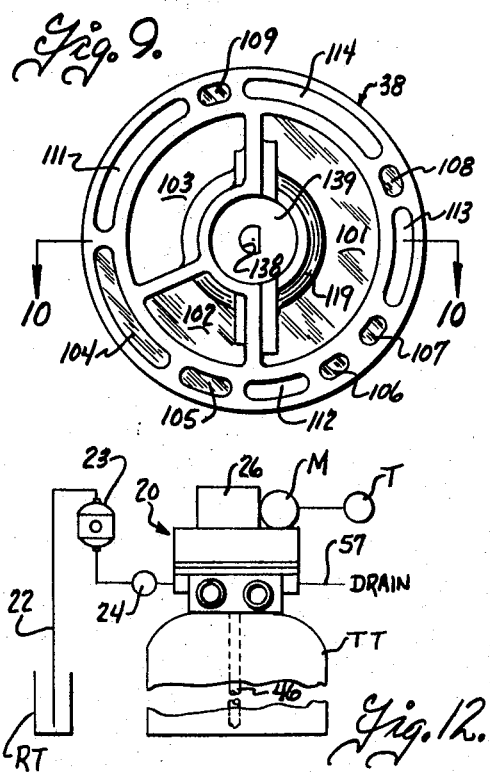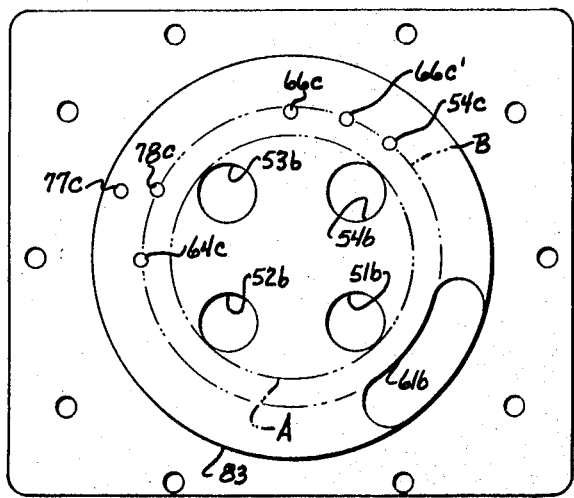

3,613,731

MULTIPORT VALVE

BACKGROUND

The invention pertains generally to fluid handling and more particularly to a multiport valve of the lift-turn type.

Multiport valves of the lift-turn type have been eminently successful for a considerable period of time. This type of valve has, however, not been widely used in some applications. One example is use in a small water treatment system. The expense of the multiport lift-turn valve has effectively precluded their use in such a system. Another disadvantage is that valves of this type are usually larger than other types of valves which will perform the same operation in a small water treatment system. One prior attempt to make a relatively small multiport valve of the lift-turn type is shown in U.S. Pat. No. 2,926,698 issued March 1, 1960 to R. A. Whitlock, Jr. Another important difficulty is that prior multiport lift-turn valves were so constructed that they could not be mounted directly on a top opening treatment tank. It can be seen that the above-mentioned deficiencies tend to aggravate one another, especially in an application to a small water treatment system.

SUMMARY:

The present invention relates to new and useful improvements in valves, and more particularly to a multiport valve of the lift-turn type.

An important object of this invention is the provision of a multiport valve of the lift-turn type and which has a porting arrangement allowing it to be very compact in size.

Another object is to provide a multiport valve of the lift-turn type which can be mounted directly on a top opening treatment tank.

Still another object is to provide a multiport valve of the lift-turn type which is of economical construction and reliable in operation.

Yet another object is to provide a valve in accordance with the foregoing object and which is constructed practically entirely of plastic.

It is another object of the present invention to provide a multiport valve of the lift-turn type in which the major flow ports are located inwardly of an imaginary circle and the auxiliary ports are located outwardly of said circle.

Another object is to provide a multiport valve of the lift-turn type which can be used to control a service valve located in the service line.

Still another object is to provide a multiport valve of the lift-turn type in which refill of the brine tank is timed.

Yet another object is to provide a valve in accordance with the foregoing object in which the refill is accomplished during fast rinse and during periods of time that the rotor is unseated.

It is another object of the present invention to provide a multiport valve of the lift-turn type which is made of plastic and so arranged that the pressure at the face of the rotor is substantially equalized.

These, and other objects and advantages of the present invention, will become apparent as the same becomes better understood from the following detailed description when taken in conjunction with the accompanying drawings.

DRAWINGS:

FIG. 1 is a view, partially elevational and partially diagrammatic, of a preferred embodiment of the present invention;

FIG. 2 is a partial vertical sectional view taken generally along line 2—2 of FIG. 4 and on a larger scale;

FIG. 3 is a partial sectional view taken along line 3—3 of FIG. 4 and on a larger scale;

FIG. 4 is a top view of the stator with the gasket illustrated in phantom lines;

FIGS. 5–8 are views illustrating the relative position of the rotor and the ports in service, backwash, brine and slow rinse, and fast rinse positions, respectively;

FIG. 9 is a bottom view of the rotor;

FIG. 10 is a cross-sectional view through the rotor taken along line 10—10 of FIG. 9;

FIG. 11 is a top view of the gasket showing the position of the ports therethrough; and FIG. 12 is a diagrammatic view of a water treatment system embodying the present invention.

DESCRIPTION:

Reference is now made more particularly to the drawings which illustrate the best presently known mode of carrying out the invention and wherein similar reference characters indicate the same parts throughout the several views.

FIG. 12 illustrates a multiport valve, generally designated 20, mounted on the top of a top opening treatment tank TT which contains a bed of exchange material. The regenerating material used in the periodic regeneration of the exchange material in the tank TT is contained in a regenerant tank RT which is connected to the valve 20 by means of a regenerant line 22. The regenerant line 22 is operative to convey regenerate fluid to the valve 20 and to convey fluid from the valve back to the tank RT to refill the same. A regenerant control apparatus 23 is interposed in the regenerant line 22 and is operable to terminate the flow of regenerant from the regenerant tank to the treatment tank when the liquid in the regenerant tank falls to a level so that air is passed into the regenerant line 22. The regenerant control 23 includes a ball float for eliminating such air from being passed to the treatment tank. One suitable form of regenerant control is illustrated and described in U.S. Pat. No. 3,237,640 issued March 1, 1966 to R. A. Whitlock et al. and reference is made thereto for a more complete description.

Also interposed in the regenerant line 22 is a flow controller 24. The flow controller is preferably of the pressure responsive type which will maintain a substantially constant rate of flow under varying pressure conditions. The flow controller may be conveniently of the type disclosed in U.S. Pat. No. 2,454,929 to L. A. Kempton, and reference is made thereto for a more complete description.

The multiport valve 20 is of the lift-turn type which has a rotor 38 adapted to be lifted, turned, and reseated in the flow through the valve. Various apparatus may be utilized for accomplishing the lifting, turning, and reseating. The apparatus diagrammatically illustrated in FIG. 12 includes a mechanism 26 connected to a stem 37 on the rotor and driven by a motor M under control of a timer T. The specific driving apparatus diagrammatically illustrated in FIG. 12 may be of convenient type. One suitable apparatus is illustrated and described in U.S. Pat. No. 2,235,287 issued March 18, 1941 to L. G. Daniels and reference is made thereto for a more complete description. The timer T which controls operation of the motor M is of any type well known in the art. It is also contemplated that the multiport valve 20 can be manually operated, if desired.

Referring now particularly to FIGS. 1 and 2, the multiport valve includes a stator 32, a resilient gasket 34 which overlies the stator and forms a functional part thereof, a cover 36 and the rotor 38. The cover 36 is preferably bolted to the stator and forms a fluid chamber therewith and the rotor 38 is contained in the fluid chamber. Preferably, the stator 32, cover 36 and rotor 38 are molded of plastic and have novel shapes cooperating to this end which will hereafter be described.

Preferably the stator 32 is arranged for mounting directly on the top opening treatment tank TT. For this purpose, an externally threaded cylindrical portion 42 is provided at the bottom of the stator. An O-ring 43 is provided for sealing to the top of the tank TT. A first bottom opening 44 is located centrally of the cylindrical portion and has a recess for an O-ring 45 to engage a conduit 46 (see FIG. 1). Conduit 46 extends to the bottom of treatment tank TT and forms a connection to the bottom of the bed of exchange material. Preferably, conduit 46 is arranged coaxial with the cylindrical portion 42 so that it does not interfere with rotation when the stator is mounted on the tank. A second bottom opening 47, generally annular in shape, is located between the first bottom opening 44 and the cylindrical portion 42 for communicating with the top of the treatment tank.

The stator 32 has four chambers 51–54 located generally in four quadrants thereof, as best shown in FIG. 4. The first chamber 51 communicates with the first bottom opening 44. The second chamber 52 communicates with a treated fluid service line 55 by means of an outlet port 52a. The third chamber 53 communicates with the second bottom opening 47. The fourth chamber 54 communicates with a drain line 57 by means of an outlet port 54a.

Located generally outwardly of the four chambers 51–54 in the stator are some other chambers. An inlet chamber 61 is connected to a raw fluid supply line 62 by means of an inlet port 61a. A regenerate chamber 64 is connected to the regenerate line 22 by means of a port 64a. A pressure chamber 66 is connected to a conduit 67 through port 66a. Conduit 67 leads to one or more service valves 68 which may, for example, be disposed in the service line to prevent flow therethrough during regeneration of the treatment tank. This will be more fully described below.

Referring to FIG. 3, there is shown an ejector E mounted in the stator 32. The ejector E may be of any type well known in the art and has a raw fluid inlet 71, a regenerant inlet 72, and a regenerant outlet 73. In the embodiment illustrated, the raw fluid inlet 71 is connected to a port 77 leading to the face of the stator. The regenerant inlet 72 is connected to a port 78 also leading to the face of the stator. The regenerant outlet 73 also leading to the face of the stator. The regenerant outlet 73 communicates with the third chamber 53, as shown in FIG. 3.

In construction, the aforedescribed stator is preferably made of plastic and is preferably molded in the described shape. The walls surrounding the chambers, both the intermediate walls and the bottom walls, are of generally uniform thickness to minimize distortion during molding. The chambers have generally sharp corners at the junctures of the side and bottom walls to cooperate in this end.

Means is provided for overlying the above-described stator chambers. This may be an auxiliary face piece (not shown) or be a function of the gasket 34. In the embodiment shown, the gasket 34 includes a steel layer 81 having a plurality of openings therein and coated with rubber 82 in such a manner that both sides of the steel layer 81, as well as the openings, are completely coated. The rubber 82 is also formed with a raised boss 83 at the center. The exact structure of the resilient gasket is an invention of another and forms no part of the present invention. The gasket 34 does, however, serve the function of overlying the four chambers and providing the below-described port arrangement which is a part of this invention. Referring to FIG. 11, the gasket 34 provides four ports 51b–54b, each of which overlies one of the four chambers 51–54 and communicates therewith. The four ports 51b–54 all lie inwardly of an imaginary circle A or preselected radius, the circle having its center at the center of rotation of the rotor 38.

A plurality of auxiliary ports are provided radially outwardly of the imaginary circle and approximately equal distance from the periphery of the imaginary circle. Referring again to FIG. 11, port 64c overlies regenerant chamber 64 and communicates therewith. Port 78c overlies port 78 which communicates with the regenerant inlet of the ejector E. Ports 66c and 66c' overlie and communicate with chamber 66; The five aforementioned auxiliary ports all lie generally on a circular line B shown in FIG. 11. Outwardly of circle B is a fluid inlet port 77c which communicates with port 77 leading to the raw fluid inlet of the ejector E. Also located outwardly of circle A and adjacent the periphery of the boss 83 is a large inlet opening 61b which overlies the inlet chamber 61 and communicates with the fluid chamber defined by the cover member or bonnet 36.

Details of the rotor 38 are shown in FIGS. 9 and 10, remembering that FIG. 9 is a bottom view thereof. A main transfer chamber 101 covers about 180° of the central portion of the rotor. A chamber 102, covering about 60° of the central portion of the rotor, lies adjacent transfer chamber 101. The function of chamber 102 is to serve as a block, as will hereinafter become apparent. An opening 103, passing through the top wall of the rotor, completes the structure of the central portion of the rotor. The central portion of the rotor overlies the ports 51b–54b and serves to transfer flows through the valve as will become apparent.

Outwardly of the central portion are auxiliary chambers and openings. A main transfer chamber 104 is provided as best shown in FIG. 9. Additional chamber 105–109 are also provided which reduce material and keep the wall thickness uniform, sometimes serving as blocks as hereafter described. Openings 111–114 are provided through the rotor and their functions will hereafter be described.

As explained, the walls of the stator 32 and of the rotor 38 on either side of the gasket 36 are each generally uniform. This provides a generally uniform pressure along the walls and thereby aids in sealing.

To reduce the force necessary to lift the rotor 38, means is provided for equalizing the pressure above and below the rotor prior to lifting. For this purpose, a lost-motion auxiliary valve is provided between the rotor 38 and the stem 37, as best seen in FIG. 2. As illustrated, the lower end 37a of the stem 37 is reduced in cross section and has a flattened side to cooperate with a mating D-shaped opening 138 in a rotor plate 139 (see FIGS. 5–8) and provide a driving connection therebetween. Rotor plate 139 is conveniently a stainless steel metal stamping secured to the rotor 38 by the illustrated fasteners or any convenient means. Much of the outer edge of rotor plate 139 is spaced from the rotor 38 to provide a flow channel 118 therebetween. The upper side of the rotor 38 has a centrally located inclined wall 119 to provide a valve seat which cooperates with a resilient valve member 37b mounted on the stem. Member 37b is advantageously formed of elastomeric material, metal coated with such material, or the like. When the stem 37 is lowered, the member 37b engages wall 119 and pushes the rotor 38 into seating engagement with the resilient gasket 34 and also prevents flow through the channel 118. When the stem 37 is raised, the member 37b engages the underside of plate 139 and raises the rotor. It can be seen, however, that there is a lost-motion connection to allow flow through the opening 118 to equalize the pressures above and below the rotor prior to lifting. As stated before, one side of the lower portion 37a is flattened to transmit rotation from the stem 37 to the rotor 38. The structure described in this paragraph is the invention of another forms no part of the present invention, and is herein included to complete the disclosure. Another suitable arrangement of an auxiliary valve which serves the same function is shown and described in U.S. Pat. No. 2,822,000 issued Feb. 4, 1968 to Daniels.

The cover 36 is also preferably molded of plastic and has walls of generally uniform thickness. The cover has a narrow circumferential rim 36a (see FIG. 2) for pressing into the resilient gasket 34 and sealing thereto.

OPERATION

FIGS. 5 through 8 illustrate the relationship of the rotor 38 to the ports in the gasket 34 in the service position, backwash position, brine and slow rinse position, and fast rinse position, respectively. The various flows at these positions will now be described.

During service position of the rotor, raw fluid is supplied through supply line 62 into chamber 61 and through opening 61b into the fluid chamber 39. From the fluid chamber, flow passes through opening 103 in the rotor, port 53b in the gasket, chamber 53 and bottom opening 47 to the top of the treatment tank TT. After being treated in the tank, treated fluid passes through connector 46, bottom opening 44, chamber 51, port 51b in the gasket, into transfer passage 101 in the rotor. The treated fluid is transferred to port 52b, chamber 52 and service line 55. Meanwhile the regenerant line port 64c is blocked by chamber 109 while normally open service valve 68, if used, is communicated to drain through ports 66c, auxiliary transfer chamber 104 and port 54c. Ports 77c and 78c are pressurized by the raw fluid in the chamber 39, but this only allows flow through the ejector to chamber 53 without drawing any regenerant fluid.

In the backwash position of FIG. 6, the rotor 38 has been rotated about 200° in the direction of arrow C. Flow from the chamber 39 passes through rotor opening 103 to both ports 51b and 52b. The flow to port 52b provides a bypass flow to service during this position of regeneration. Flow through port 51b passes to the bottom of the treatment tank to backwash the same with an upflow backwash. Flow from the top of the tank passes through port 53b and is transferred by transfer passage 101 to port 54b which communicates to drain line 57 through chamber 54. Again, ports 77c and 78c are pressurized but no regenerant is drawn through the ejector since port 64c is blocked by chamber 105. The normally open service valve 68, if used, is closed by pressure supplied through ports 66c or 66c'. Drain port 54c is blocked by chamber 108.

In the brine and slow rinse position of FIG. 7, raw fluid is bypassed to service through opening 103 in the rotor and port 52b. Raw fluid inlet port 77c is pressurized while regenerant inlet port 78c is communicated with port 64c by means of chamber 104. This allows the ejector E to draw regenerant from the regenerant tank RT and pass it with the raw fluid into chamber 53. Flow from the chamber 53 passes through bottom opening 47 to the top of the tank. From the bottom of the tank, the fluid is then passed through conduit 46 to chamber 51 and therefrom through port 51b and into transfer chamber 101. Transfer chamber 101 transfers the fluid to drain through port 54b. The normally open service valve 68, if used, is closed by pressure supplied through port 66c. After the regenerant has been exhausted, the flow through the line 22 is ceased by means of regenerant control 23, as described above. Thereafter, flow of the raw fluid through the ejector provides a slow rinse of the exchange material in the treatment tank and this rinse is passed to drain in the manner described above.

In the fast rinse position of FIG. 8, raw fluid is still passed to service through opening 103 and port 52b. Transfer chamber 101 still communicates ports 51b and 54b to pass fluid from the bottom of the tank to drain. The amount of the rinse is increased by communicating a portion of port 53b with opening 103 in the rotor. Thus, additional flow of raw fluid is passed to the top of the tank. In this position, port 66c' is pressurized to close the normally open service valve 68. Port 64c is also pressurized and allows raw fluid to pass into the regenerant line 22 to at least partially refill the regenerant tank. During the time that the rotor 38 is unseated, additional flow will be passed through port 64c to refill the regenerant tank. Since the total of these time intervals is substantially a constant, the amount of refill will be a constant by the function of the flow controller 24, previously described.

The above description of the operation has referred to possible use of the normally open service valve 68. Such a valve is advantageous when two treatment tanks are used in parallel. In that manner the second tank is operative while the first is being regenerated.

In some circumstances it is desirable to use two or more service valves in a single tank unit. For example, it is possible to utilize a valve 20 that is smaller than usual by dividing the supply line 62 into two branches (not shown) and the service line 55 into two branches (not shown). In such an arrangement it is possible to accommodate flow of a 1 ½-inch line through branches of 1 inch size, for example. This supplies a high flow rate to the valve and allows the use of a smaller valve which lowers the overall cost. In such an application, an adapter (not shown) between the stator 32 and treatment tank TT is necessary to accommodate the additional lines. The two service valves are each positioned in one branch of the service and supply lines to reduce flow during regeneration. This will also reduce bypass flow during that time. If full bypass flow is desired, an exterior bypass line with a third service valve which is normally closed may be provided.

It is felt that the above-described multiport valve is relatively small, of economical construction, and can be mounted directly on a top-opening treatment tank. The valve can provide bypass fluid to service during regeneration or can operate a service valve to shut off service during that time. The valve is made primarily of molded plastic, yet is sure in made primarily of molded plastic, yet is sure in operation. Timed refill of the regenerant tank is accomplished partly during fast rinse and partly during periods of time the rotor is unseated.

While a preferred embodiment of the invention has herein been illustrated and described, this has been done by way of illustration and not limitation, and the invention should not be limited except as required by the scope of the appended claims.

The embodiments of the invention in which an exclusive property or privilege is claimed are defined as follows:

I claim:

1. In a multiport valve of the lift-turn type for use in a fluid-treatment system and including a stator, a cover attached to the stator and forming a fluid chamber therewith, a ported rotor in the cover and cooperable with the stator to control the flow of fluid through the valve, and means for lifting, turning and reseating the rotor in preselected rotational positions to establish different flows through the valve; characterized by:

the stator having a flat face adjacent the rotor and a plurality of major flow ports in the face, said major flow ports all lying within an imaginary circle of preselected radius having its center at the center of rotation of the rotor, the stator also having two auxiliary ports located outwardly of the imaginary circle and approximately the same distance from the periphery thereof;

an ejector on the stator and having a raw fluid inlet, a regenerant inlet connected to one of the auxiliary ports, and a regenerant outlet;

means connecting the other auxiliary port to a regenerant line; and the rotor having a passage for interconnecting the two auxiliary ports in one rotational position to allow the ejector to draw regenerant through the regenerant line, and the rotor arranged to block at least one of the auxiliarly ports in all other rotational positions.

2. A multiport valve as set forth in claim 1 including a threaded connection at the bottom of the stator for mounting the valve directly on a top-opening fluid treatment tank, and the stator having top and bottom tank openings disposed inwardly of the threaded connection.

3. A multiport valve as set forth in claim 1 wherein the stator has exterior openings for connection to a raw water supply line, a treated fluid service line, a drain line, and the regenerant line, whereby all exterior connections are on the stator; and whereby the cover is formed of plastic and bolted to the stator whereby the cover can be easily removed.

4. A multiport valve as set forth in claim 1 wherein the stator, rotor, and cover are all formed of plastic.

5. A multiport valve as set forth in claim 1 wherein the stator is molded of plastic and has walls of generally uniform thickness to minimize distortion during molding.

6. A multiport valve as set forth in claim 1 wherein the stator has at least two other auxiliary ports located approximately the same distance from the imaginary circle as the first two auxiliary ports; and including a normally open service line in the service line adapted to be closed by fluid pressure during regeneration of the treatment tank, means connecting the service vale to one of said other auxiliary ports, means connecting the second of said other auxiliary ports to the drain line; and wherein the aforestated rotor passage interconnects the two other auxiliary ports in a service position, and the rotor is arranged to supply fluid pressure to the service valve to close the same in all other rotational positions, whereby the service valve is closed during regeneration and relieved to drain during service position.

7. The combination of claim 1 wherein the valve is arranged for refill of a regenerant tank through the regenerant line, and at least part of the refill occurs through the other auxiliary port each time the rotor is unseated, whereby refill is accomplished during multiple periods.

8. The combination of claim 7 wherein the means for lifting, turning, and reseating the rotor includes a timer for controlling the time of the operation and the time that the rotor is at each position; and including a pressure-responsive flow control device in the regenerant line for maintaining a preselected generally uniform rate of flow therethrough during each of the multiple periods.

9. The combination of claim 8 wherein the rotor also has a position for partial refill of the regenerant tank while the rotor is seated, which position is also timed by the timer, whereby the total of the refill times is a constant to provide a generally uniform amount of refill of the regenerant tank.

10. In a multiport valve of the lift-turn type for use with a fluid treatment tank and including a ported stator, a cover attached to the stator and forming a fluid chamber therewith, means communicating the fluid chamber with a raw fluid supply line, a ported rotor in the cover chamber and cooperable with the stator to control the flow of fluid through the valve, and means attached to the rotor for lifting, turning, and reseating the rotor in succeeding rotative positions to change the flow of fluid through the valve; characterized by:
- the stator having connecting means at its bottom for mounting the stator directly on a top-opening treatment tank, a first bottom opening located centrally of the connecting means for connection to a bottom tank connecting line, and a second bottom opening located between the first bottom opening and the connecting means for communicating with the top of the tank;
- the stator also having first, second, third and fourth chambers located generally in four quadrants thereof, the first chamber communicating with the first bottom opening, the second chamber communicating with a treated fluid service line, the third chamber communicating with the second bottom opening, and the fourth chamber communicating with a drain line;
- means overlying the four chambers and providing four ports, each port lying in one of the quadrants and communicating with only one of the chambers, the four ports all lying inwardly of an imaginary circle of preselected radius, said means also providing two other ports located outwardly of said imaginary circle and approximately the same distance from the periphery of the imaginary circle;
- an ejector on the stator and having a raw fluid inlet, a regenerant inlet connected to one of said other ports, and a regenerant outlet;
- means connecting the other one of said other ports to a regenerant line; and
- the rotor arranged for interconnecting the two other ports in one rotative position to allow the ejector to draw regenerant through the regenerant line.

11. A multiport valve of the lift-turn type as set forth in claim 10 wherein the means communicating the fluid chamber with a raw fluid supply line includes an inlet opening in the stator for connecting to the raw fluid supply line, and an inlet chamber in the stator communicating with the inlet opening and the cover chamber; and wherein the cover is formed of plastic and bolted to the stator; whereby all external connections are located on the stator and the cover can be easily removed.

12. A multiport valve of the lift-turn type as set forth in claim 10 wherein the stator, rotor and cover are all molded of plastic material.

13. A multiport valve of the lift-turn type as set forth in claim 12 wherein the walls surrounding the first, second, third, and fourth chambers are of generally uniform thickness to minimize distortion during molding of the stator.

14. A multiport valve of the lift-turn type as set forth in claim 10 wherein the means overlying the four chambers has third and fourth ports located outwardly of the imaginary circle; and including a service valve in the service line and having a pressure chamber for receiving fluid pressure to operate the service valve, means connecting the service valve pressure chamber to the third port, and means connecting the fourth port to drain; and wherein the rotor applies raw fluid inlet pressure to the third port at least one rotative position and communicates the third and fourth ports at least one other rotative position to close the service valve during regeneration.

15. A multiport valve of the lift-turn type as set forth in claim 14 wherein the service valve is normally open, and the rotor has a channel therein which interconnects said two other ports in the regenerant position and which also interconnects the third and fourth ports in the service position to relieve the service valve pressure chamber to drain.

16. A multiport valve of the lift-turn type for use in a fluid treatment system including a treatment tank and including:
- a ported stator molded of plastic material and having: walls, of generally uniform thickness throughout, a flat face at the top, an externally threaded cylindrical portion at the bottom for mounting the plastic stator directly on a top-opening treatment tank, a firs bottom opening located centrally of the cylindrical portion, and a second bottom opening located between the first bottom opening and the cylindrical portion for communicating with the top of the treatment tank;
- a tubular conduit arranged coaxially with the cylindrical portion and mounted on the stator at the first bottom opening and extending to adjacent the bottom of the treatment tank;
- the ported stators plastic walls including sidewalls having openings therein for connection to a raw fluid supply line, a treated fluid service line, a drain line, and a regenerant line whereby all external connections are to the plastic stator;
- a cover formed of plastic material and removably mounted on the top of the plastic stator in sealed relation thereto to form a fluid chamber therewith;
- a ported rotor formed of plastic material and disposed in the fluid chamber of the plastic cover and cooperable with the plastic stator to control the flow of fluid through the valve; and
- means attached to the plastic rotor for lifting, turning, and reseating the rotor in succeeding rotational positions to provide a multiplicity of different flows through the valve.

17. Apparatus according to claim 16 wherein the plastic cover has a bore therein extending perpendicular to the flat face of the plastic stator; and the last-mentioned means includes a stem attached to the rotor and slidably and rotatably received in the bore, and means for operating on the stem for lifting, turning, and reseating the rotor.

18. Apparatus according to claim 16 wherein the rotor is molded of plastic and has walls of generally uniform thickness throughout, and the walls defining some inoperative dummy channels to maintain the uniform wall thickness and equalize pressure when the rotor is seated.

PO-1050
(5/69)

UNITED STATES PATENT OFFICE
CERTIFICATE OF CORRECTION

Patent No. 3,613,731           Dated October 19, 1971

Inventor(s) Robert A. Whitlock

It is certified that error appears in the above-identified patent and that said Letters Patent are hereby corrected as shown below:

Column 6, Claim 3, line 52, "whereby" should be -- wherein --;
         Claim 6, line 62, "line" should be -- valve --;
         Claim 6, line 65, "vale" should be -- valve --.

Column 8, Claim 14, line 13, after "at" should be inserted -- at --
         Claim 14, line 14, after "at" should be inserted -- at --
         Claim 16, line 29, "firs" should be -- first --.

Signed and sealed this 18th day of April 1972.

(SEAL)
Attest:

EDWARD M. FLETCHER, JR.           ROBERT GOTTSCHALK
Attesting Officer                   Commissioner of Patents